United States Patent [19]

Kruse et al.

[11] Patent Number: 4,487,002
[45] Date of Patent: Dec. 11, 1984

[54] AUTOMATIC GROUND SPEED CONTROLLER

[75] Inventors: James W. Kruse, Farmington, Mich.; Gary W. Krutz, 605 Northridge Dr., West Lafayette, Ind. 47906; Larry F. Huggins, West Lafayette, Ind.

[73] Assignee: Gary W. Krutz, West Lafayette, Ind.

[21] Appl. No.: 502,719

[22] Filed: Jun. 9, 1983

Related U.S. Application Data

[63] Continuation of Ser. No. 284,359, Jul. 17, 1981, abandoned.

[51] Int. Cl.³ .............................................. A01D 41/00
[52] U.S. Cl. ................................. 56/10.2; 56/DIG. 15
[58] Field of Search ......................... 56/10.2, DIG. 15

[56] References Cited

U.S. PATENT DOCUMENTS

| | | | |
|---|---|---|---|
| 3,073,099 | 1/1963 | Andersen | 56/10.2 |
| 3,093,946 | 6/1963 | Pitt et al. | 56/10.2 |
| 3,442,068 | 5/1969 | Bulin | 56/10.2 |
| 3,470,681 | 10/1969 | Saemann | 56/10.2 |
| 3,515,144 | 6/1970 | Morrison | 56/10.2 |
| 3,552,398 | 1/1971 | Looker | 56/10.2 |
| 3,606,742 | 9/1971 | Wieneke et al. | 56/10.2 |
| 3,659,618 | 5/1972 | Kobald et al. | 56/10.2 |
| 4,130,980 | 12/1978 | Fardal et al. | 56/10.2 |
| 4,332,127 | 6/1982 | Staiert et al. | 56/10.2 |
| 4,337,611 | 7/1982 | Mailander et al. | 56/10.2 |

FOREIGN PATENT DOCUMENTS

| | | | |
|---|---|---|---|
| 1536522 | 12/1978 | United Kingdom | 56/10.2 |
| 221409 | of 1968 | U.S.S.R. | 56/10.2 |
| 296508 | of 1971 | U.S.S.R. | 56/10.2 |
| 554832 | of 1977 | U.S.S.R. | 56/10.2 |

*Primary Examiner*—Gene Mancene
*Assistant Examiner*—David L. Tarnoff
*Attorney, Agent, or Firm*—Barnes & Thornburg

[57] ABSTRACT

An automatic control varies the ground speed of a combine due to changing field conditions, based on engine speed and combine feeder conveyor load variables.

8 Claims, 25 Drawing Figures

AUTOMATIC GROUND SPEED CONTROLLER

This is a continuation of application Ser. No. 06/284,359 filed July 17, 1981, now abandoned.

This invention relates to automatic controls, and more specifically to a microprocessor-based ground speed controller which can vary the speed of a combine.

The advantages of electronics have been used to solve difficult control and production problems and to make problems more manageable. Uses of electronics have proliferated due to the reduction in cost of microprocessors and digital components. Also, the reliability of these components has improved.

The first computer was a stationary arithmetical calculator. Now, with the help of microprocessors, the computer's uses have broadened to include controllers, text processors, data storage, interpreters, and many other uses. Now, the application of computers to mobile equipment is being undertaken to improve machine productivity.

One industry which now uses mobile electronics is the automotive industry. Certain new models of automobiles no longer offer carburetors on gasoline engine vehicles as standard equipment (Givens, Larry, 1980, Engineering Highlights of the 1981 Automobiles, *Automotive Engineering*, October, pp. 51-74). A microprocessor-controlled fuel injection pump replaces the carburetor in such cars (Bowler, Lauren L., 1980, Throttle Body Fuel Injection: An Integrated Engine Control System, *Automotive Engineering*, October, Vol. 88, No. 10, pp. 102-110, SAE Paper 800164). In fact, all 1981 GM gasoline cars are equipped with a control system designed to reduce emissions without penalizing fuel economy. The system is a refined version of the C-4 system supplied by GM on its 1979 California cars (Grimm, R.A., R. J. Bremer, and S. P. Stonestreet, 1980, GM Expands C-4 System Use, *Automotive Engineering*, Aug., Vol. 88, No. 8, pp. 33-41, SAE Paper No. 800053). The system's calculator is an electronic control module (ECM). In the 1981 CADILLAC, the ECM processes inputs from 45 engine sensor circuits (Givens, *supra*) and displays sensed data to the driver or a service technician in case of a malfunction (Walters, William L., 1980, Electronic Emission Control Diagnoses its Own Problem, *Automotive Engineering*, August, Vol. 88, No. 8, pp. 43-48). Ford Motor Company (*Mechanical Engineering*, February 1979, pp. 49-51), Chrysler Corporation (Givens, *supra*), and Nissan Motor Company (Ikeura, Kenji, Akio Hosaka, and Tsuneomi Yano, 1980, Microprocessor Control Improves Economy, Reduces Emissions, *Automotive Engineering*, February, Vol. 88, No. 2, pp. 47-51, also SAE Paper 800056) also have similar projects.

Other computer equipment available for automotive use includes an aftermarket unit manufactured by OBC Products (Automotive Computer, *Mechanical Engineering*, February 1979, p. 57) which calculates and displays such items as mileage. A product of Delco Electronics Division of General Motors (Learner, Karl C., III. 1980, A Microcomputer-Based Automotive Comfort Control System, SAE Paper 800476) electronically controls automobile on-board heating and air conditioning functions to a temperature set by the operator. Mitsubishi Electric Corp. (Horikini, Kenji, Torohike Ando, Hirosni Yamane, and Hirotsugu Arai, 1980, Liquid Crystal Dash Displays Increase in Size, *Automotive Engineering*, February, Vol. 88, No. 2, pp. 73-75, SAE Paper 800235) has developed for automotive instrument panels a large-area liquid crystal display (LCD) that electronically displays operating functions, including warning lights common on many automobile dash panels. Borg-Warner has announced an electronic control for automatic transmissions for the mid-1980's. A present design uses a Motorola 6800 series microprocessor as part of a torque sensor system to control the shifting and reduce the number of valves in the transmission (Electronic Transmission Control Expected by Mid-80s, in News and New Products, *Automotive Engineering*, March, Vol. 88, No. 3).

Further work is being done in several areas. One interesting application is replacing a vehicle cam shaft with electronically controlled valves. This may permit easier starting, very low idle speeds, constant torque, and use of the engine as a braking system (Computer Replaces Cam in Project Engine, *Autoweek & Competition Press*, May 1976). Work has been done to replace the engine distributor with a microprocessor which determines proper ignition timing. Input signals include flywheel position and manifold pressure (Lappington, John and LaVerne A. Caron, 1978, Chrysler-Microprocessor Spark Advance Control, SAE Paper 780117; Integrated Ignition System Has No Distributor, *Automotive Engineering*, Jan. 1979, Vol. 87, No. 1, pp. 29-30).

One type of control system available on automobiles for several years is the so-called "cruise control" for maintaining substantially constant vehicle speed.

Use of microprocessors on automobiles was not without problems. First, sensors had to be developed which could produce adequate signals that could be used directly or conditioned for the microprocessor. Many types of sensors were developed to determine position, pressure, air flow, oxygen level, knock, and fuel flow (Wolber, William G., 1980, Engine Control Sensors for the '80s: A Preview, *Automotive Engineering*, April, Vol. 88, No. 4, pp. 28-39, SAE Paper 800121). Sensors for such information as position had to be carefully placed to get an accurate reading without interference (Reick, Peter, 1980, Getting Reliable Signals from Position Sensors, Eaton Corporation, Milwaukee, Wis.). The environments of the microprocessor and sensors had to be considered. Factors such as shock, vibration, temperature, induced voltages, current transients, ignition noise, voltage supply variations, and electromagnetic compatibility had to be considered (Electromagnetic Compatibility Must be Assured, *Automotive Engineering*, January 1979, Vol. 87, No. 1, pp. 53-59). As an example, temperature extremes and capacitive coupling can cause a change in the propagation delay of logic gates which, in turn, can cause malfunction in high speed logic when operation tolerance limits are close (Dummermuth, Ernst., 1980, Design Tips for Reliable Logic, *Machine Design*, Jan. 10, pp. 93-96).

Interfacing the microprocessor and sensors introduced its own set of problems. If the microprocessor had to execute program routines to convert an analog voltage or count pulses, the speed and accuracy of the microprocessor could suffer (Morrison, Robert L., 1978, Linking Microcomputers To The Outside World, *Machine Design*, Sept. 21, pp. 118-125). Many functions, such as counting pulses, can be performed by external circuits, such as programmable timing modules in which several signals are monitored (Farrell, James J. III, 1980, Faster Reflexes for Microcomputers, *Machine Design*, Feb. 21, pp. 70–75). The large number of conductors required to convey signals could also become a problem when monitoring and controlling a large number of signals. Fiber optic cables can conduct large numbers of signals with encoders and decoders on the sending and receiving ends of the cables (Rogers, Wesley A., D. R. Kimberlin, and R. A. Meade, 1980, Multiplexing Simplifies and Expands Driver Controls, *Automotive Engineering*, August Vol. 88, No. 8, pp. 50–54).

The design of a control system can be accomplished several ways. The designer with a microprocessor can minimize hardware, software, execution time, or development time in achieving the objective of his control algorithm. "Debugging" the microprocessor control system has been one of the most time-consuming jobs when too much minimization takes place. Hardware designs have been optimized to facilitate easy troubleshooting (Brack, J. W., 1980, Designing Electronics for Easy Troubleshooting, *Machine Design*, Feb. 7, pp. 74–78). Specialized or additional hardware has been used to establish breakpoints for software debugging (Sundman, Guy, 1979, Hardware Breakpoints Aid 8080 Program Debugging, *Electronics*, May 24, p. 171). Additional software has also been written to detect hardware faults and display the locations of faults on a console terminal (Brack, J. W., 1979, Finding Hardware Faults With Software, *Machine Design*, Feb. 22, pp. 175–179).

There are estimates that software cost exceeds hardware cost by a substantial amount when all costs are accounted for. To minimize software costs, certain guidelines should be observed. Writing of the software should be done in a high level language whenever possible, because a programmer will normally average about 15 lines of debugged code per day, whatever language is being used. Since one line of high level language may be equivalent to 10 to 15 lines of assembly language, there are significant advantages to using a higher level language (Boyle, Don R., 1978, The Agonies of Automating Almost Anything, *Agriculture Engineering*, Oct., pp. 50–52).

Electronics is particularly well-suited to the control of hydraulic systems. Just a few operational amplifiers can provide an analog electronic signal extremely useful for control of hydraulic torque, power, or speed (Electronic Transmission Control expected by Mid-80s, News and New Products, *Automotive Engineering*, March 1980, Vol. 88, No. 3). Some of the advantages of electrohydraulic controls include flexibility, improved system performance due to lack of common drift in analog circuits, ability to incorporate additional features, and possible reduced cost (Henke, R. W., 1979, Must Fluid Power Interface with Control Computers?, *Hydraulics and Pneumatics*), July, p. 82; Decker, R. L., Microcomputer Control of Mobile Hydraulic Systems, Fluid Power Conference, Chicago, pp. 193–197).

Work has been done on developing a special computer language for controlling hydraulics (Decker, R. L., 1978, A Microcomputer Language for Controlling Hydraulic Systems, ASME Publication 78-DE-W-1). It is a form of specialized "programmable control" language. Microprocessors presently control stepper valves (Ibiary, Y. M., J. N. Wilson, and P. N. Nikiforuk, Design and Performance of a Microprocessor-Based Digital Flow Control Valve, University of Saskatchewan, Fluid Power Conference, Chicago, pp. 199–201) and have the potential to control the speed and feed rate of a farm combine cylinder (Mailander, Michael, 1980, Computer Control of a Hydraulically Driven Combine Cylinder, Purdue University, September, SAE Paper No. 801019).

Agricultural sector microprocessor-based automatic control is still in the experimentation and specialized use stage. Projects to control and/or collect data from a greenhouse system (Willits, D. H., T. K. Karnoski, W. F. McClure, and E. H. Wiser, 1978, A Microprocessor-Based Control System for Greenhouse Research, ASAE Paper No. 78-5547), a weather monitoring station (Wiser, E. H., J. H. Young, and R. E. Harris, 1978, Microcomputer-Based Weather Data Acquisition System, ASAE Paper No. 78-5546), a crop environmental chamber (Dunlap, J. L., J. M. McKinion, J. E. Parsons, C. J. Phene, J. R. Lambert, and D. N. Baker, 1978, Microprocessor-Based Data Acquisition and Control Hardware for the SPAR System, ASAE Paper No. 78-5544; Parsons, J. E., Dunlap, McKinion, Phene, Baker, 1978, Microprocessor-Based Data Acquisition and Control Software for the SPAR System, ASAE Paper No. 78-5545), and a grain dryer controller (Hinkle, Charles N., 1980, 8-Bits for a Grain Dryer, ASAE Paper 80-5021) all have their own individually developed operating systems.

Several microprocessors for farm implements are already available. Massey-Ferguson (*Massey-Ferguson News Release*, Aug. 29, 1980, Produced by Harlan S. Miller, *MF Adds to Top of its 4WD Tractor Line*, and *MF 4900 Electronic Linkage System*, MFR 072880) offers a factory option electronically controlled three-point hitch system. Dickey-john (Whitaker, Roger B., A Microprocessor Based Tractor Performance Monitor Using a Microwave Doppler Radar, Dickey-john Corp., Fluid Power Conference, pp. 203–205) offers a microprocessor-based radar ground speed sensor. Several companies have add-on or standard units for farm tractors, field sprayers, or combines to monitor ground speed, area covered, gallons of liquid being applied, shaft speeds, grain loss, and displays to inform the operator regarding the functions he is performing.

Other experiments include vehicular guidance systems (Young, R. E. and R. L. Schafer, 1977, Vehicular Guidance Simulator for Digital Automatic Control, ASAE Paper No. 77-1582) and electronic gear or transmission shifters (Electronic Gear Shifter Simplifies Scraper Control, 1980, *Machine Design*, June 26, p. 40; Report of the Annual Meeting of Stockholders, 1980, Deere & Company, April 29). The use of microprocessors will continue and increase because of their versatility and cost. Standardization will become necessary as the use of microprocessors on farms and mobile equipment broadens (Puckett, H. B., E. F. Olver, 1977, Programmable Controllers for Agriculture Processing and Production Systems, ASAE Paper No. 77-3502).

Some work in controlling combines has been done in the past. Huisman et al (Huisman, W., J. van Loo, J. J. Heijning, 1973, Automatic Feed Rate Control of a Combine Harvester in Wheat, Department of Agriculture Engineering, Agriculture University, Wageningen, Netherlands) tested a controller in wheat in 1971 and 1972. They were attempting to control grain losses from the walkers. To do this, they had to control the amount of material movin9 over the walkers by changing the ground speed. They used the torque on the gathering auger in the header as the input to change the ground speed.

Kawamura et al (Kawamura, Tsuneo, Noboru Kawamura, and Kiyoshi Namikawa, 1977, Adaptive Feed Rate Control Head Feeding Type Combine Digital Sampled Data Adaptive Control System, *Journal of the Society of Agriculture Machinery,* Japan, Vol. 39, No. 2, p. 157) tested an automatic combine in rice. Their final system consisted of three input signals, engine speed, straw layer thickness, and variation in straw layer thickness, with all signals converted to digital logic and controlled by logic gates. The output signals were pulses to a hydrostatic drive.

Fardal and Rickerd (Fardal, Randolph G., Calvin P. Rickerd, 1978, Combine Automatic Travel Control System, U.S. Pat. 4,130,980, Dec. 26) developed for International Harvester an analog ground speed controller for a combine with four transducers monitoring analog signals. One input signal to the analog controller was an engine speed tachometer which produced a signal when the speed fell below a set point. A second input signal was from a grain loss monitor. A third input signal into the signal combining circuitry was a combination of the output signals of two transducers. Two load sensors (measuring tension on the tight sides of the drive belts) were attached to the drives of the threshing cylinder and the cutting and conveying mechanisms. The signals then were combined in different proportions via a switch (because a corn head requires more power to operate than a grain head). All three input signals were combined and provided to comparator circuitry which appropriately positioned a hydraulic cylinder governing a control mechanism for a hydrostatic transmission valve, which then changed the ground speed.

Clemson University and the University of Illinois (Tanzy, Kathleen, 1980, Computerize Your Combine, *Soybean Digest,* July/Aug., pp. 8-9) are also doing research in controlling combines.

According to an aspect of the invention, an automatic control for combine ground speed includes means for sensing the load of a crop being harvested on the combine feeder conveyor, means for establishing a desired combine ground speed, means for varying an output signal in response to variation in feeder conveyor load and engine speed, and means for coupling the output signal to the means for establishing a desired combine ground speed to adjust the combine ground speed.

Illustratively, the control further includes means for establishing a desired engine speed range. The signal-varying means varies the output signal in response to variation of the engine speed outside of the desired range. Means are provided for establishing combine ground speed acceleration and deceleration rates. The rate-establishing means controls the combine ground speed acceleration and deceleration in response to the output signal.

In an illustrative embodiment, the feeder conveyor is driven by a fluid motor, and the means for sensing crop load on the feeder conveyor includes means for sensing fluid pressure drop across the motor.

According to another aspect of the invention, a method for controlling combine ground speed includes the steps of sensing the load of a crop being harvested on the combine feeder conveyor, using the variation of the signal as an on/off switch of the automatic engine speed-based control system. An appropriate acceleration is encountered when the automatic control is turned off to accelerate the combine back to full operator-commanded ground control. The feeder conveyor pressure signal was also used as a plug detection for the feeder conveyor and the control system would stop the combine when this happened.

The invention may best be understood by referring to the following description and accompanying drawings which illustrate the invention. In the drawings:

FIGS. 1a-3 are partly block and partly schematic circuit diagrams of portions of the system illustrated in FIG. 1;

Figure 1:
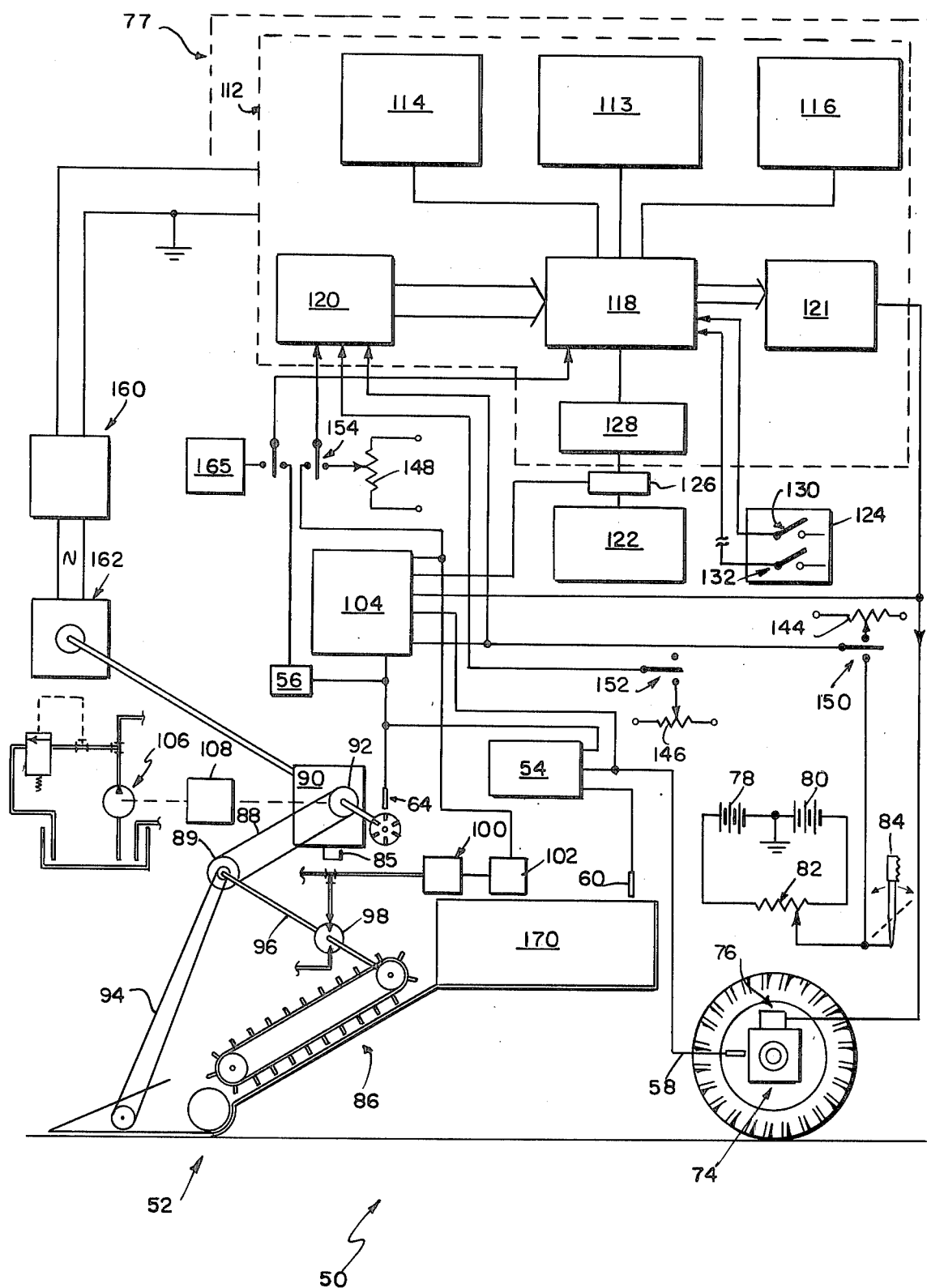
FIG. 1 is a partly block and partly schematic diagrammatic illustration of a system constructed according to the invention.
Figure 6:
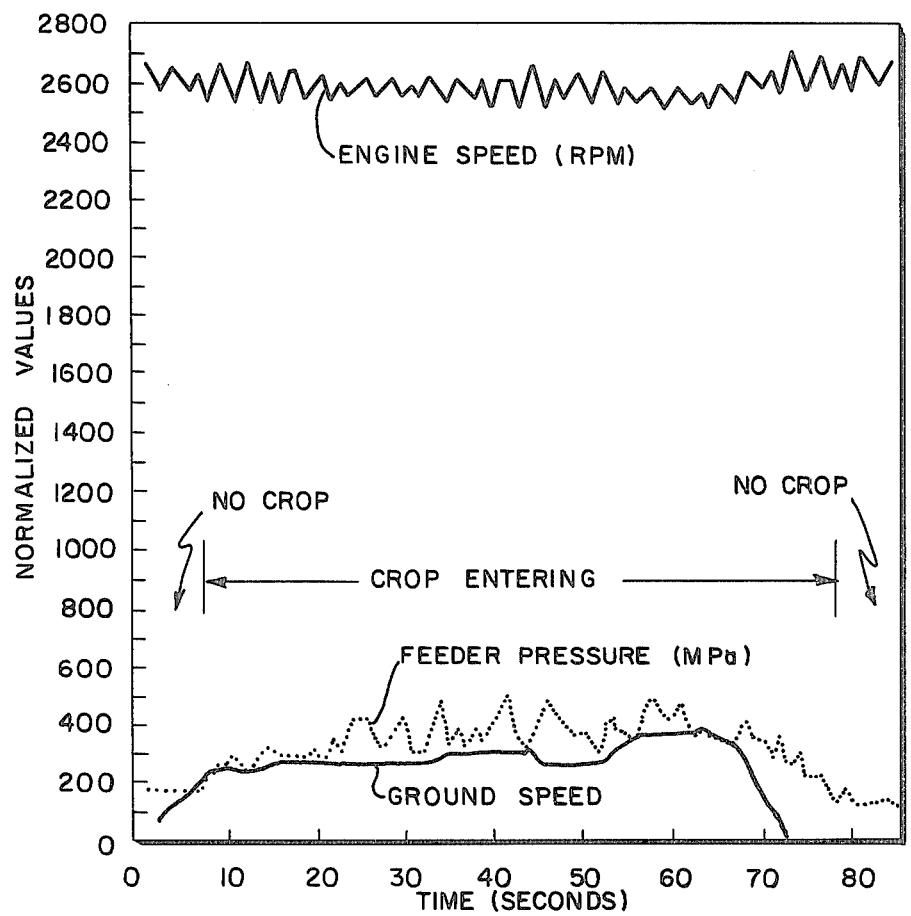
Figure 7:
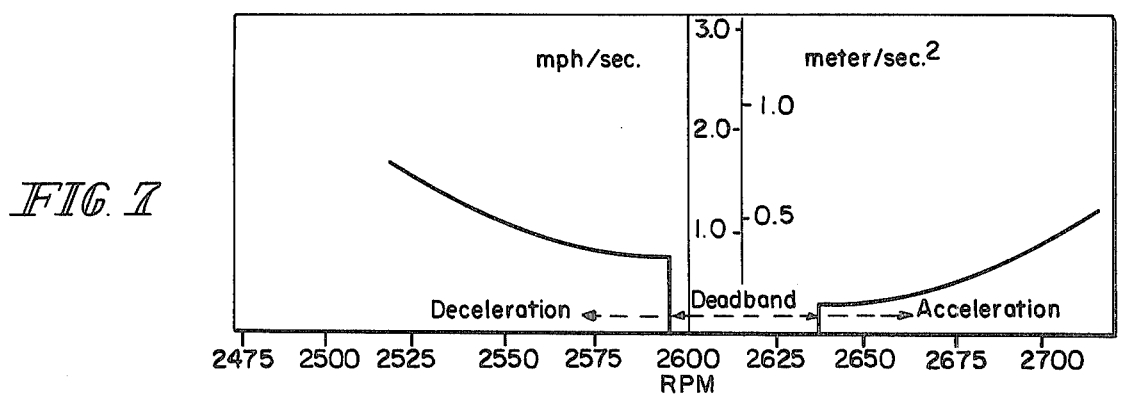
Figure 8:
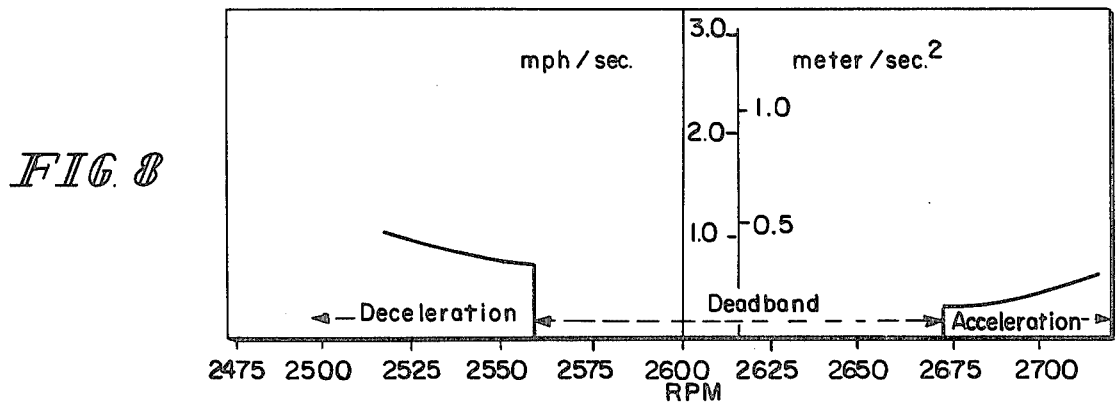
Figure 9:
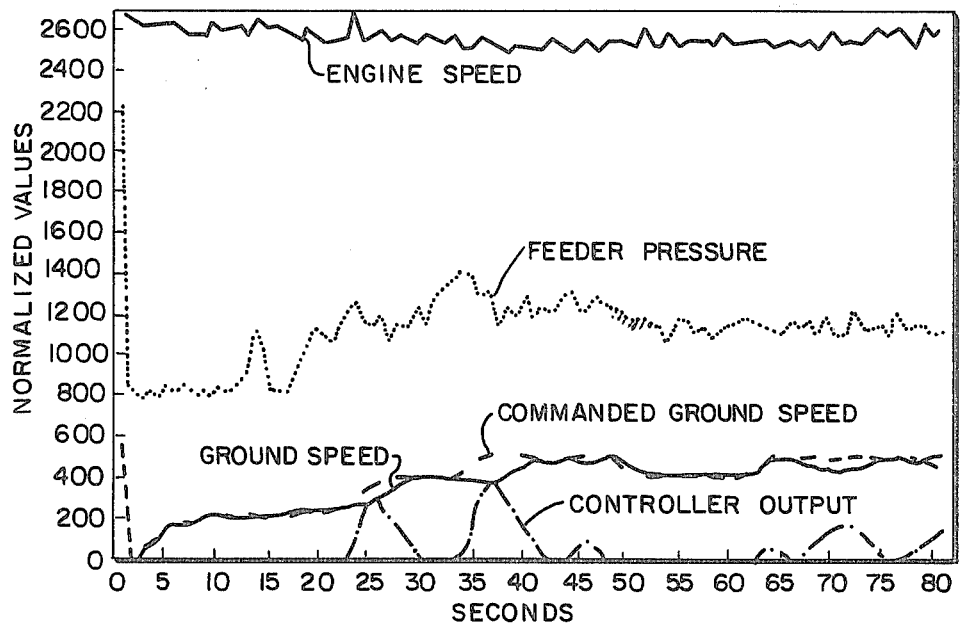
Figure 10:
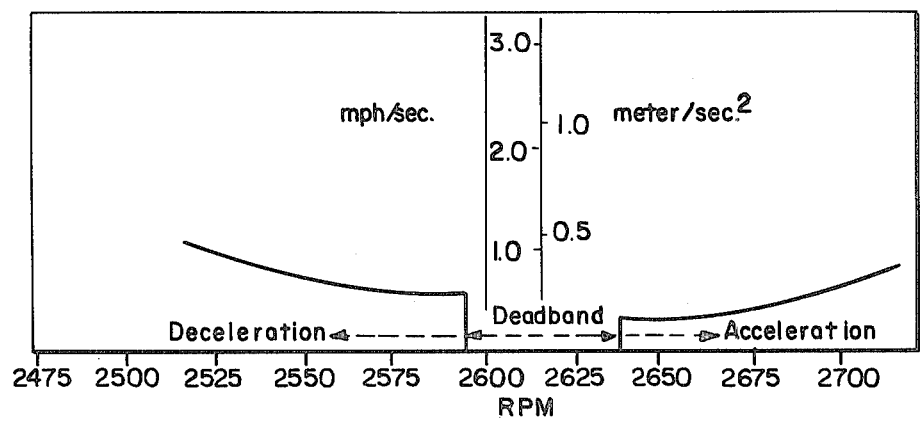
Figure 11:
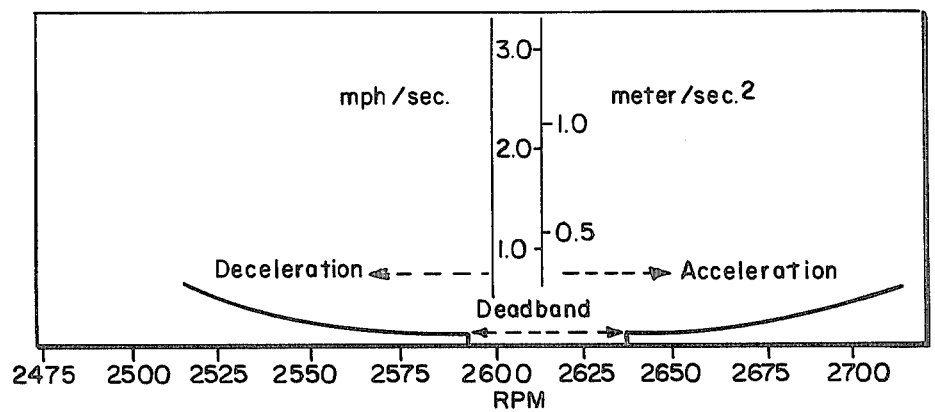
Figure 12:
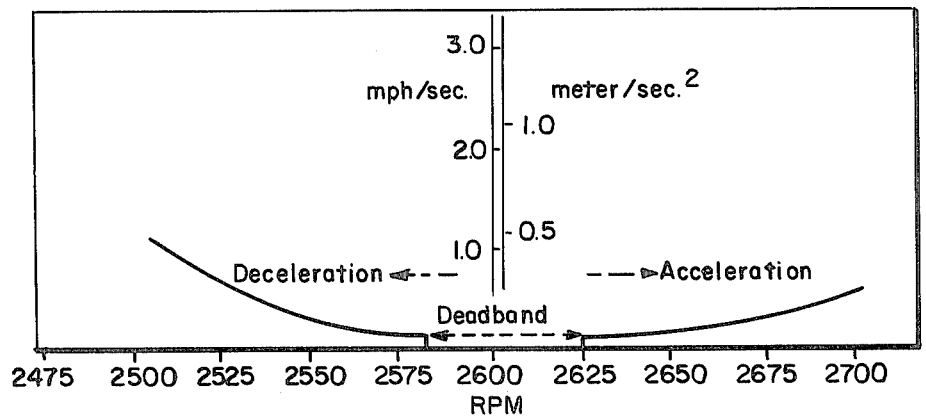
Figure 13:
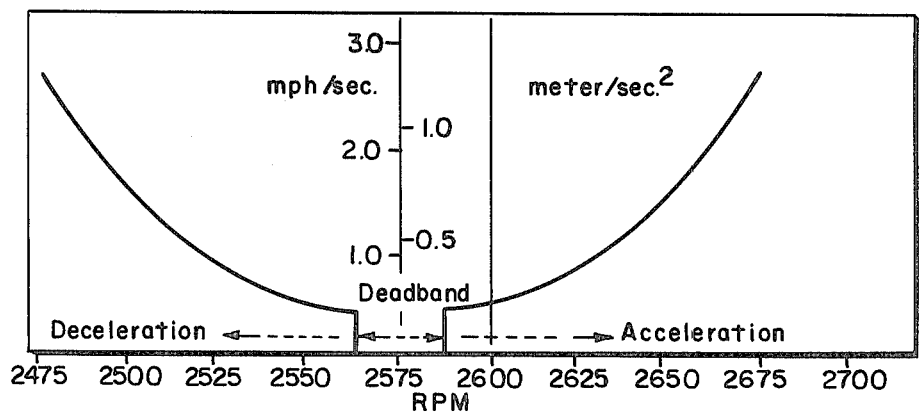
Figure 14:
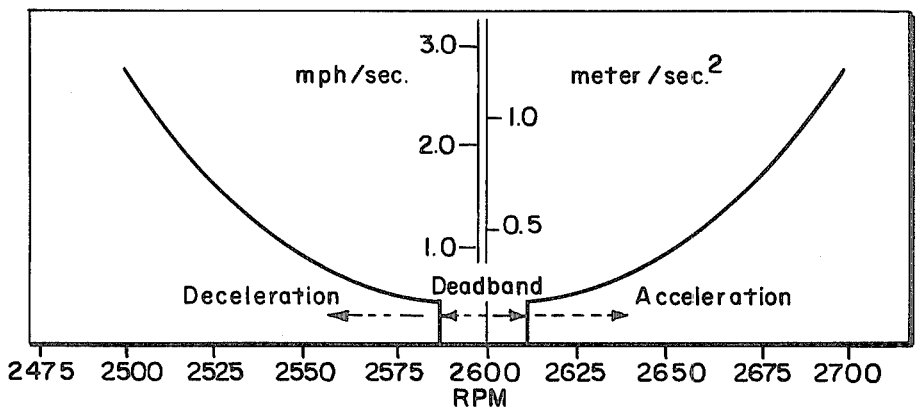
Figure 15:
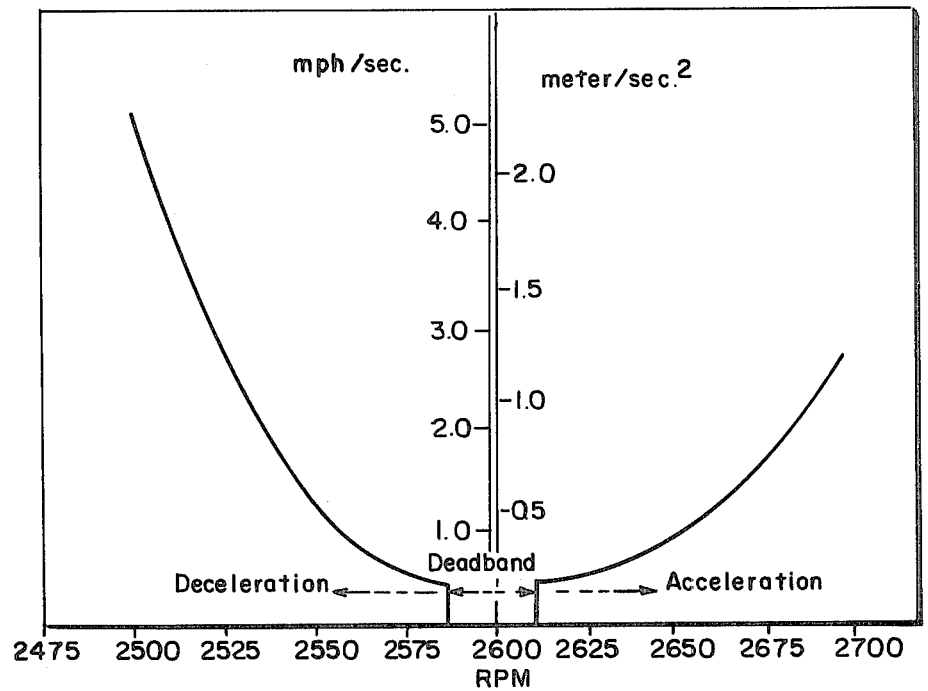
Figure 16:
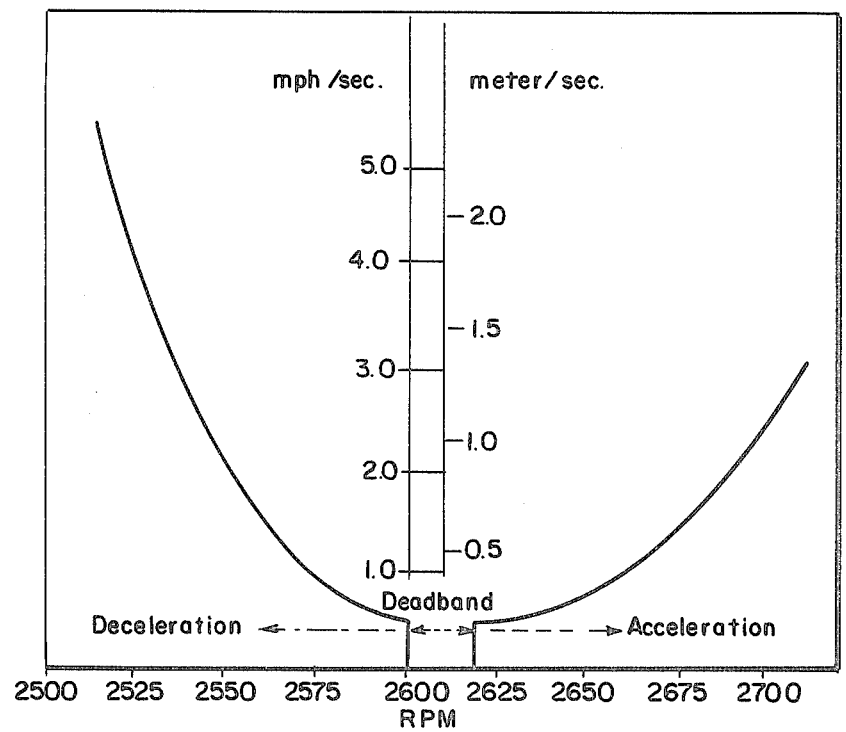
Figure 17:
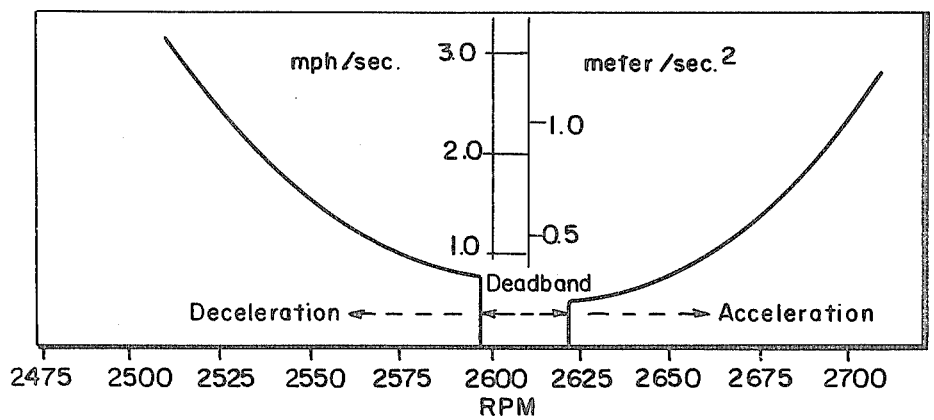
Figure 18:
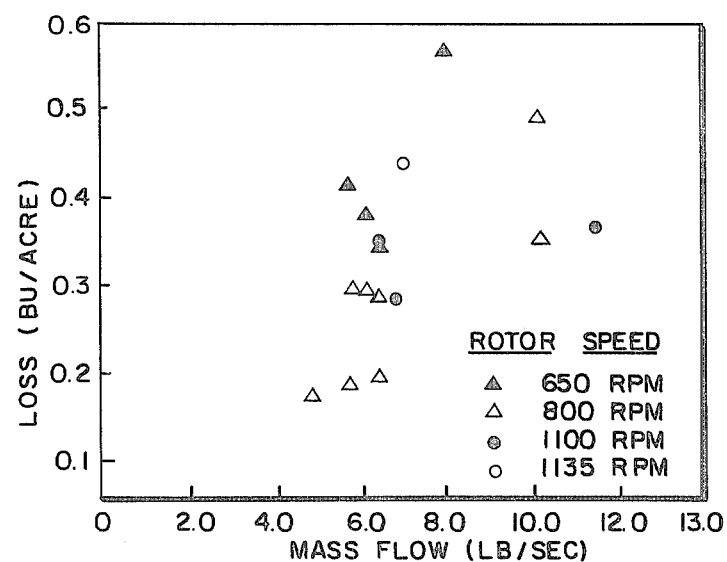

FIGS. 5a-g together comprise a more detailed flow chart for a computer program for controlling the system of FIG. 1;

FIG. 6 is a combined set of graphs of engine speed and feeder pressure changes during an operating interval for the system of FIG. 1;

FIG. 7 is a combined set of graphs of acceleration and deceleration characteristics used during an operating interval for the system of FIG. 1;

FIG. 8 is a combined set of graphs of acceleration and deceleration characteristics used during an operating interval for the system of FIG. 1;

FIG. 9 is a combined set of graphs of engine speed and feeder pressure changes during an operating interval for the system of FIG. 1;

FIG. 10 is a combined set of graphs of acceleration and deceleration characteristics used during an operating interval for the system of FIG. 1;

FIG. 11 is a combined set of graphs of acceleration and deceleration characteristics used during an operating interval for the system of FIG. 1;

FIG. 12 is a combined set of graphs of acceleration and deceleration characteristics used during an operating interval for the system of FIG. 1;

FIG. 13 is a combined set of graphs of acceleration and deceleration characteristics used during an operating interval for the system of FIG. 1;

FIG. 14 is a combined set of graphs of acceleration and deceleration characteristics used during an operating interval for the system of FIG. 1;

FIG. 15 is a combined set of graphs of acceleration and deceleration characteristics used during an operating interval for the system of FIG. 1;

FIG. 16 is a combined set of graphs of acceleration and deceleration characteristics used during an operating interval for the system of FIG. 1;

FIG. 17 is a combined set of graphs of acceleration and deceleration characteristics used during an operating interval for the system of FIG. 1; and, FIG. 18 is a combined set of graphs of loss versus mass flow rate at various threshing rotor speeds using the system of FIG. 1.

Referring now to FIG. 1, an International Harvester 1460 rotary combine 50 was modified to mount the equipment necessary for data collection and control. An IH 820 15-foot grain head 52 was used to test the automatic control.

Figure 1A:
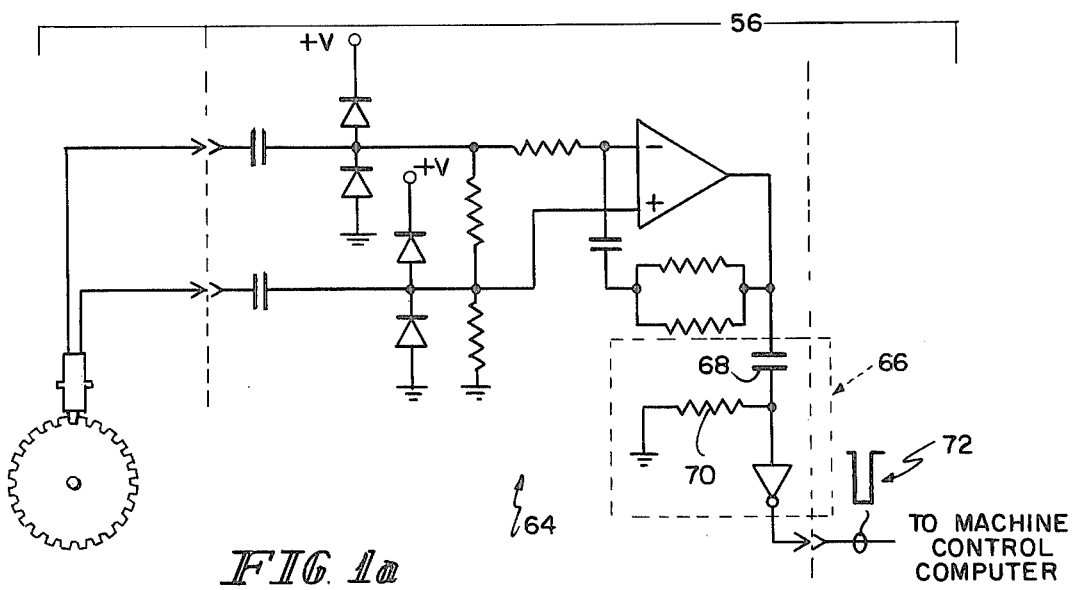

The combine 50 is equipped with a digital display 54 showing the outputs of the engine speed, ground speed, and rotor speed sensors 64, 58, 60, respectively. The engine speed sensor 64 was not modified. Another engine speed sensing electronic circuit 56 was constructed and connected to the existing engine speed sensor 54. Circuit 56 (FIG. 1a) conditioned the engine speed signal into an input signal for a computer. The circuit 56 conditions the signal into a square wave and includes a half-monostable timer 66 which provides a pulse 72. The pulse 72 length is determined by the values of a capacitor 68 and a resistor 70. The pulse 72 duration can be estimated from the equation:

$$T = 0.8RC$$

where T=period (seconds); R=resistance (ohms); and C=capacitance (Farads).

The combine had a manually controlled hydrostatic transmission 74. The conventional manual control was replaced by an electronic Moog hydrostatic controller 76. The module containing the electronics for the controller was placed in the combine 50 cab 77 under the instrument panel. To provide the necessary electrical power to operate the Moog controller 76, two 12 volt lead-acid batteries 78, 80 were mounted in the engine compartment. Opposite poles of batteries 78, 80 were grounded to provide both positive and negative voltages for the controller 76.

It was still necessary to provide some kind of mechanical interface between the operator and the electronic controller. The interface selected was an O.E.M. Controls potentiometer 82 which provided fast response and selection of the proper adjustable friction for the lever 84.

The combine 50 feeder conveyor 86 drive was modified so that its power requirements could be measured and used as a mass flow rate indicator. An indication of the material flow through the feeder indicated that at some future time similar flow could be expected at the threshing mechanism.

The feeder conveyor 86 drive pulley 89 and the grain head 52 were driven from a V-belt 88 on an engine 90 jack shaft 92. V-belt 88 drove the feeder 86 drive pulley 89, and another V-belt 94 supplied power from the feeder drive 89 to the grain head 52. The feeder 86 drive shaft 96 was uncoupled from the drive pulley 89 and the drive pulley 89 was permitted to spin freely on the drive shaft 96 supported by bearings. A Ross Gear MAB 08 motor 98 was coupled to the drive shaft 96 to power the feeder 86. Brackets were made to hold the motor 98. A pressure transducer 100 was coupled across the motor 98 to measure the pressure drop required to run the feeder 86.

The transducer 100 was powered by a strain gauge amplifier 102. The transducer 100 was calibrated so that a 2000 psi differential pressure from the transducer 100 would cause an output of 3.2 volts from the amplifier 102. This signal was then coupled to a Digital Equipment Company PDP 11/03 computer system 104 installed on the combine 50 to store large quantities of data for later analysis. Analog-to-digital (A/D) converters, digital-to-analog (D/A) converters, counters, and latch output control boards were included in the system 104 for conditioning input and output signals. To record the data, the system 104 included an AED 6200LP floppy disk storage system.

The hydraulic power for the motor 98 driving the feeder 86 was supplied by a flow-control 10 gpm pump 106 on the combine 50. The combine's original equipment auxiliary hydraulic pump was replaced with a Curtis Splitting-T gearbox 108. The feeder drive pump 106 was coupled to one gearbox output and the original equipment pump (not shown) was coupled to the other gearbox output. The flow was manually controllable by a three-position toggle switch (not shown) in the operator's cab.

To provide automatic control of combine 50 ground speed, an Intel SBC 80/05 computer 112 having an Intel 8085 microprocessor 118, RAM 114 and PROM 116 memory, I/O (input/output) terminals 113 and bus connections was installed. To convert analog 120 and digital 121 signals, a Burr Brown MP8418 analog/digital board was employed, with a compatible bus to the computer 112.

Other hardware which made computer 112 operational included an operator interface via a console terminal 122 and a start-up/interrupt control 124. To keep the amount of equipment on the combine as compact as possible, the data acquisition and storage computer 104 used the same console terminal 122 as the machine control computer 112. A switching box 126 was used which could connect either the data acquisition computer 104 or the machine control computer 112 to the console terminal 122.

Figure 2:
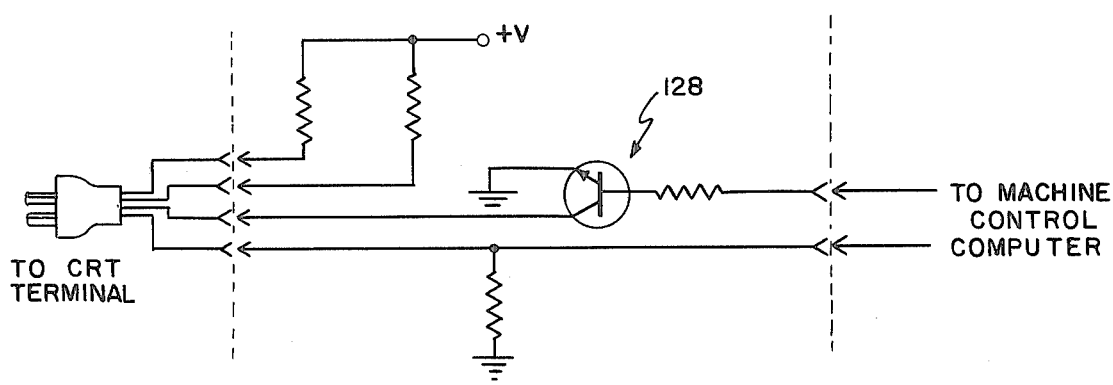

The machine control computer 112 included a serial driver and receiver to communicate with the operator's terminal. An interface to convert the signal from TTL to current loop driver logic 128 is shown in FIG. 2.

Figure 3:
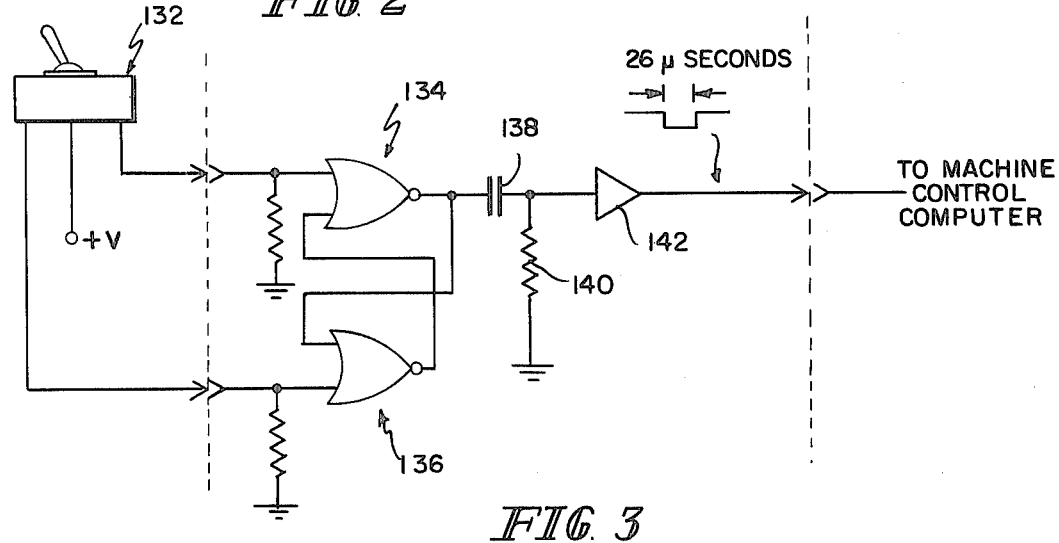

To restart and control the operation of computer 112, two momentary switches 130, 132 were provided. Momentary push button switch 130 was used to reinitialize the machine control computer 112. Momentary toggle switch 132 was used to interrupt the machine control computer 112 program during testing so the values of the acceleration and deceleration rates could be changed. To make debugging the software easier during testing, the interrupt routine initialized by closing switch 132 also causes the values of the internal registers of computer 112 to be displayed. A short interrupt pulse was needed which would interrupt the computer 112 every time switch 132 was activated. To accomplish this, a bounceless switch with a timed output was chosen for switch 132. FIG. 3 illustrates the switch 132 arrangement. NOR gates 134, 136 were used to get the bounceless effect and a half-monostable timer, including capacitor 138, resistor 140, and operational amplifier 142, was used to get the desired pulse length, here 26 $\mu$ sec.

Other hardware was included to make testing of the machine control computer 112 and controlling software easier. Three linear 10K$\Omega$ potentiometers 144, 146, 148 were mounted on the machine control computer 112. Potentiometers 144, 146, 148 were used to simulate the signals the A/D circuits 120 of machine control computer 112 would encounter during actual control situations in the field. Testing and calibration of the A/D circuits 120 were accomplished using potentiometers 144, 146, 148. SPDT toggle switches 150, 152, 154 were mounted adjacent potentiometers 144, 146, 148. Switches 150, 152, 154 selectively connected A/D circuits 120 to respective potentiometers 144, 146, 148 or to signal sources of actual combine 50 operating conditions.

To supply the voltage and current necessary to the machine control computer 112 and related hardware, a Sorenson TP6-5, 120 VAC-to-5 VDC power supply 160 was used. A portable AC generator 162 was mounted on the combine to generate the 120 VAC.

When adding the machine control computer 112 and associated hardware to the combine 50, the computer's location was important. The machine control computer 112 was mounted so that it and associated equipment were readily accessible for observation, adjustment, and repair without impairing operation of the combine 50. The operator's cab 77 was selected as the location for the equipment, since it already was equipped for temperature, dust, and vibration control. The equipment was enclosed in an add-on unit to the combine cab 77 to avoid impairing the vision and comfort of the operator. The instrumentation housing was attached to the right of the operator's cab 77.

The computer 112 controlling program attempts to keep the engine 90 speed at an adjustable desired speed (target speed established by potentiometer 146) or within a desired range or deadband. To do this, the controlling program monitors the engine 90 speed and calculates the difference between the desired and actual speed. An appropriate acceleration or deceleration constant is then calculated and supplied to the Moog controller 76 on the combine 50 transmission 74 to change the ground speed.

Figure 4:
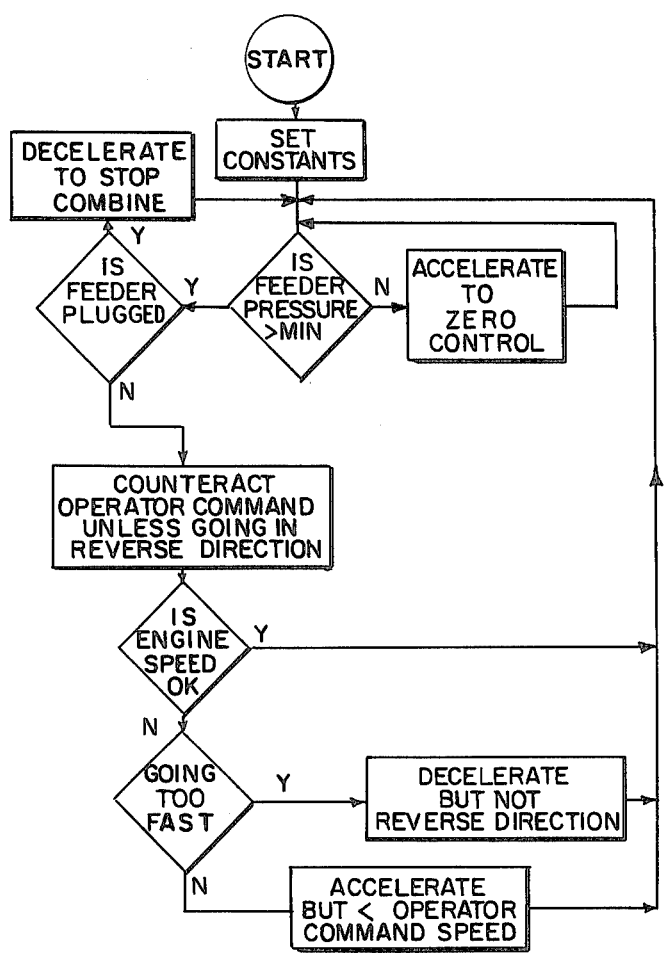
FIG. 4 is a greatly simplified flow chart for a computer program for controlling the system of FIG. 1.
Figure 5A:
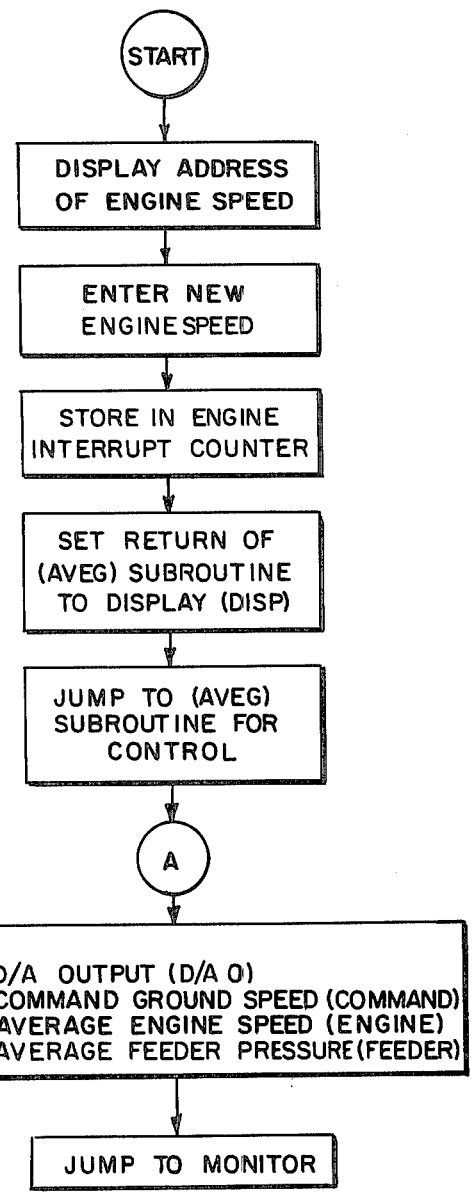
Figure 5B:
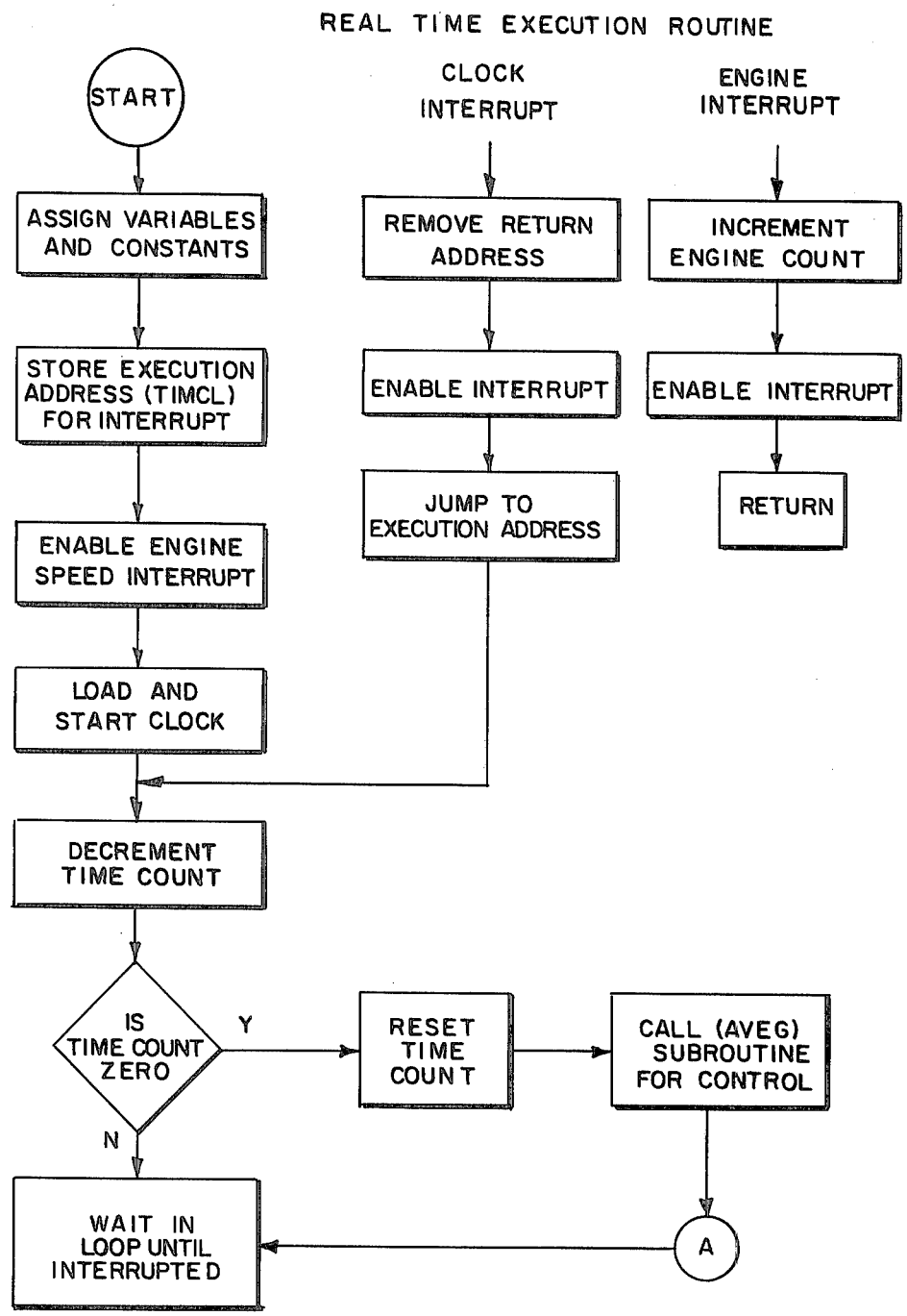
Figure 5C:
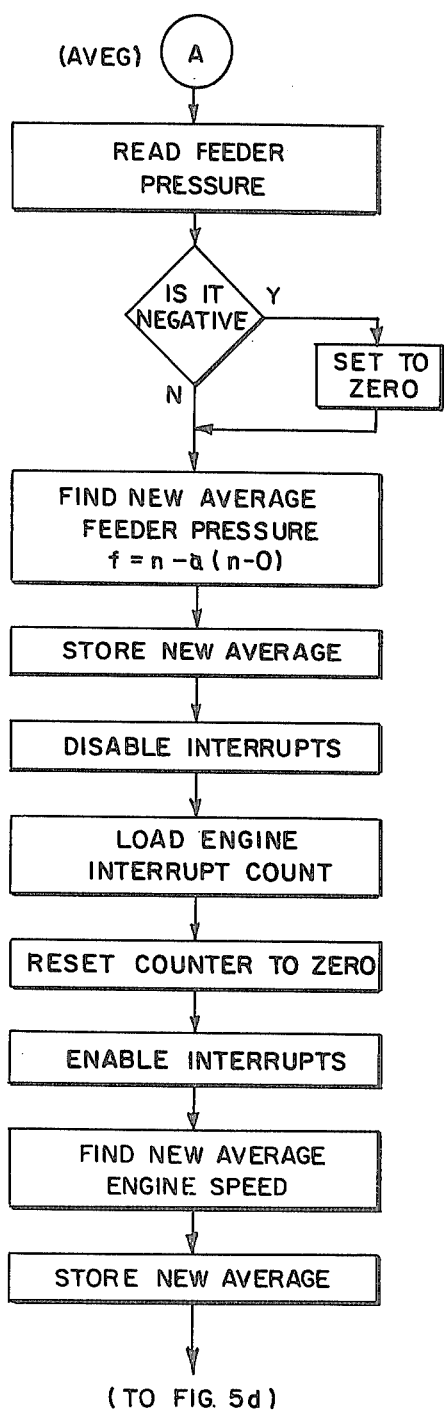
Figure 5F:
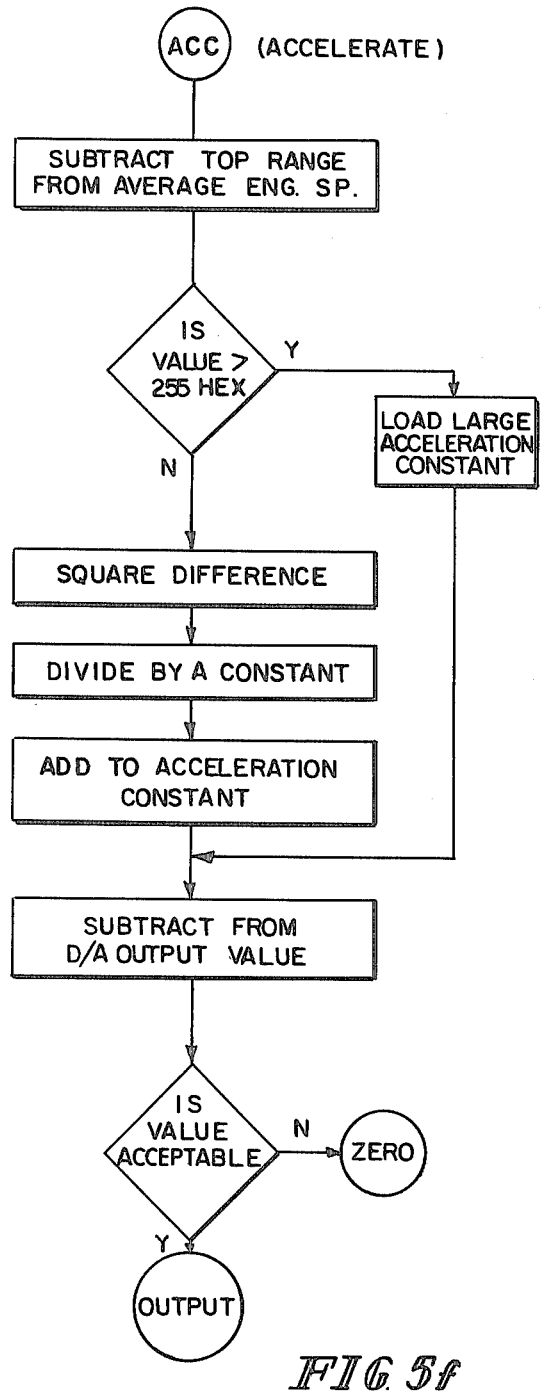
Figure 5D:
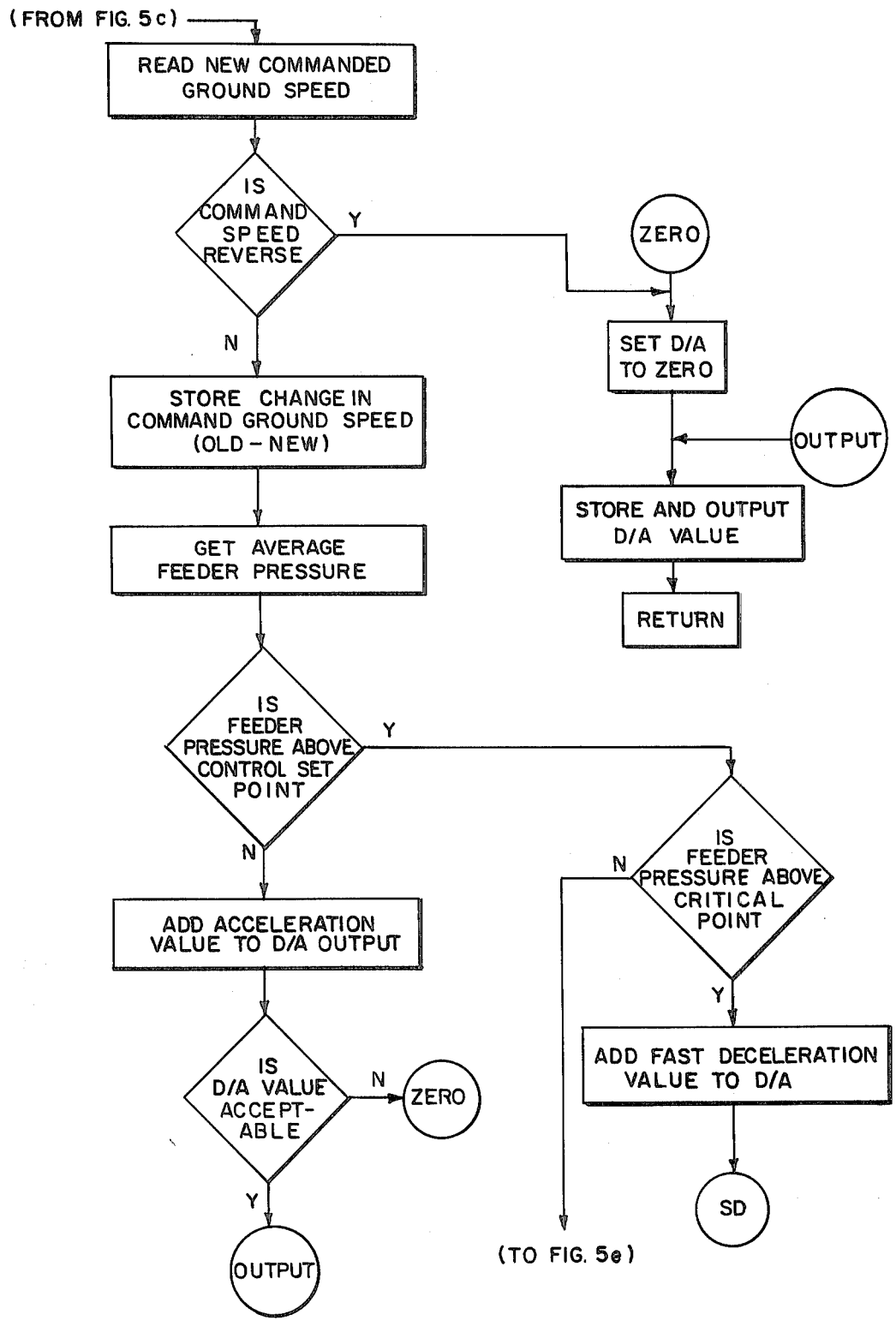
Figure 5E:
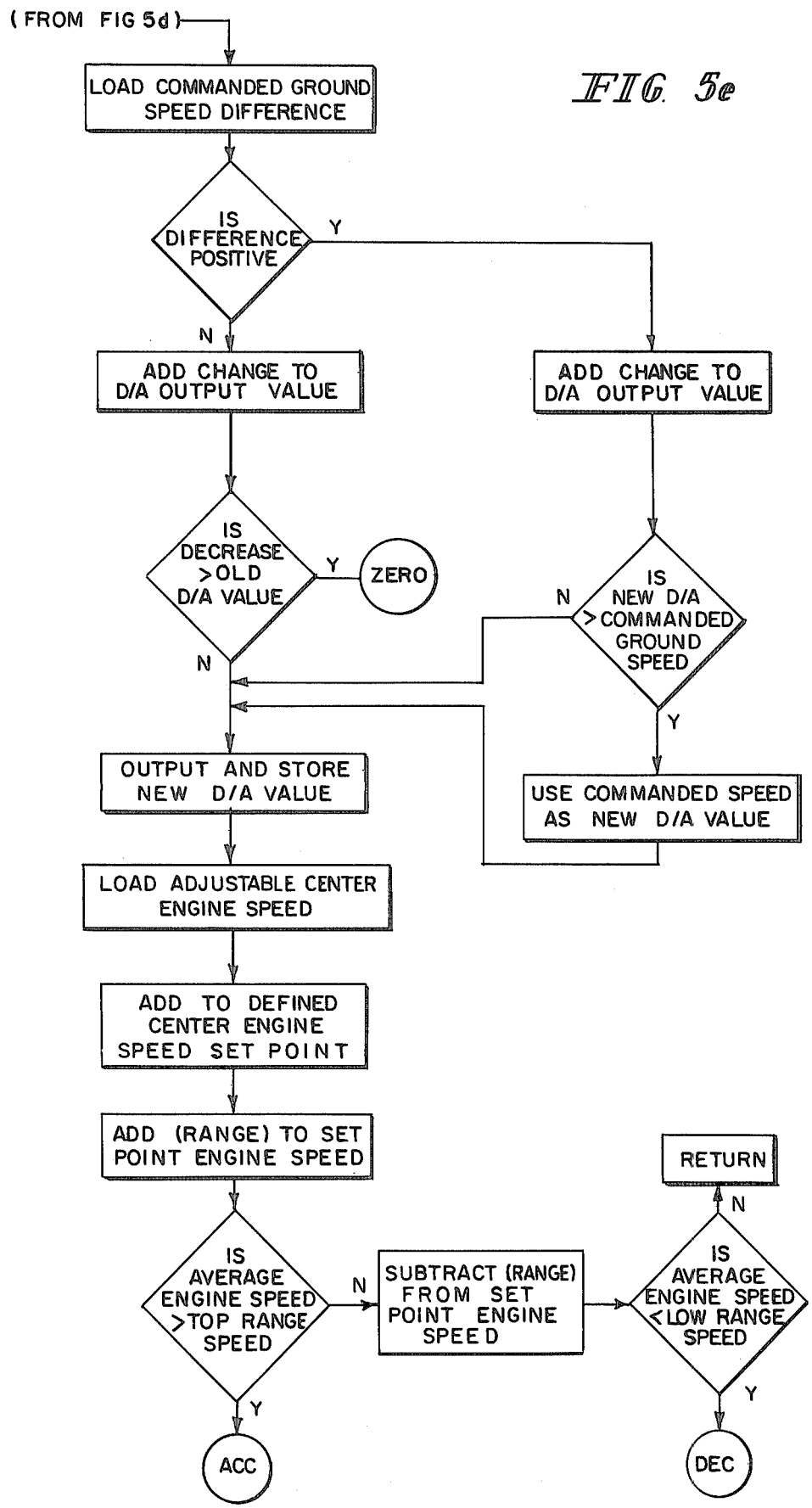
Figure 5G:
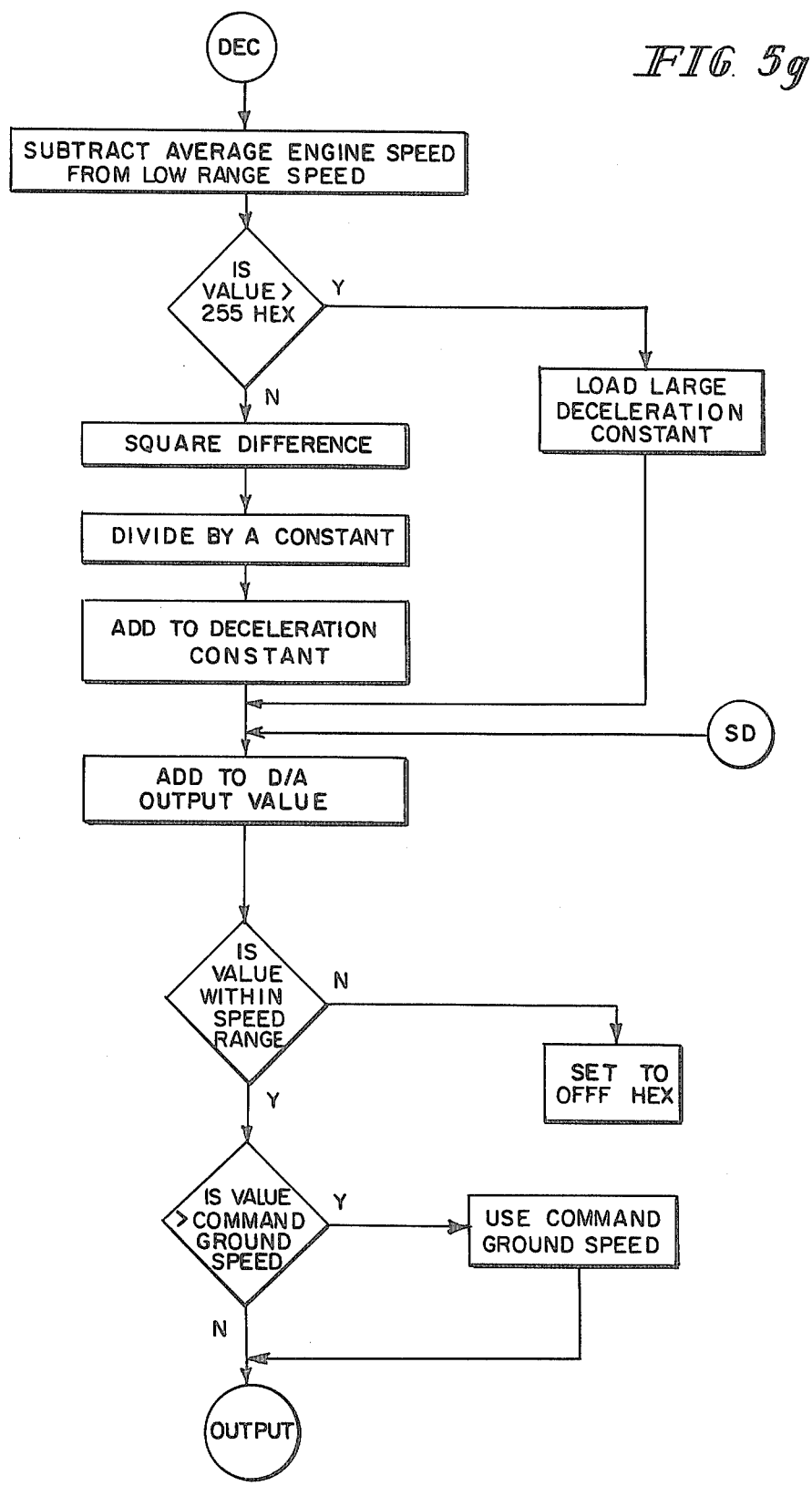

The controlling program gave the operator complete control of the combine 50 when it was not harvesting a crop. As the combine entered the crop to be harvested, the feeder 86 load increased above a set value and the controlling part of the software program started. The operator set a maximum forward speed for the combine by the position of the combine's ground speed control lever 84. If the operator continued to attempt to increase his ground speed by moving the lever 84, the controller program would offset this attempted acceleration and would only accelerate combine 50 at the rate determined by the controlling program, assuming the engine 90 speed were above the deadband set zone. Otherwise, no acceleration would occur, or deceleration would occur if the engine 90 speed were below the deadband. Thus, while harvesting, the operator could change his maximum allowed forward speed. The controlling program was designed to permit only changes in the ground speed between the maximum speed set by the operator's command (control lever 84) and zero speed, but never to cause combine 50 to go in reverse. FIG. 4 illustrates a simplified flow diagram of the program.

The controlling program continued to loop through and monitor the engine 90 speed. The program continually made corrections by monitoring the engine speed at the rate of three times per second. If the engine 90 speed stayed above the set point long enough, the controlling program would accelerate the combine 50 to the speed to which the operator had set his ground speed (potentiometer 82). At the other extreme, if the engine 90 speed stayed below the set point long enough, the controlling program would decelerate the combine 50 until it stopped, but would never cause the combine 50 to go in reverse, no matter to what speed the maximum forward commanded ground speed is set.

The controller continued to operate in this mode until the combine 50 came to the end of the crop. As the combine 50 exited the crop, the feeder 86 load decreased below a set point. When this happened, the controlling program accelerated the combine 50 back to full operator commanded 84 speed. Therefore, the control program no longer would have an effect on the ground speed determined by the control lever 84 until the crop was again entered.

The combine 50 was equipped with data acquisition and storage —DAS—computer 104 (Digital Equipment Company PDP 11/03) and other instrumentation to record the outputs of sensors on the combine 50. After making field test runs, the data recorded by the DAS computer 104 was analyzed.

The engine 90 speed varied closely with the threshing rotor 170 speed because of a belt drive between the two. The signal from the differential feeder 86 pressure transducer 100 showed that it could be used to sense the crop entering the combine 50.

All of the software was written in mnemonic code.

The average feeder 86 load was also used to determine if the feeder had plugged and stopped turning. If the feeder load got above a predetermined value (1,400 psi), the controlling program decelerated the combine 50 at a faster rate in an attempt to quickly decrease the combine's forward travel to decrease the rate at which the crop was cut and processed while the feeder 86 was overloaded. Again, the controlling program would not cause the combine 50 to go in reverse, but could only stop it.

The feeder 86 pressure was used as an on/off switch for the controlling program so that the operator could reduce his engine 90 speed with the throttle 85 without the combine 50 coming to a stop commanded by the controlling program. The operator might want to move the combine 50 at less than full throttle during unloading, during energizing the cutting 52, feeding 86, and threshing 170 parts of the combine 50, or during moving around the field. By turning on and off the controlling program automatically, the operator did not have to do it and switching controlled by the program was smooth.

A detailed flow diagram is illustrated in FIGS. 5a-g.

The machine control computer 112 included an Intel 8085 microprocessor, two 8-bit I/O ports, a 6-bit I/O port, timer clock, bus driver hardware, 256 bytes of on-board RAM, plus two sockets for EPROMs. Either 2K or 1K EPROMs could be used in the sockets by changing some jumpers on the computer 112 board. During power-up, the computer started at address 0000(hexadecimal) which was the beginning address of one of the EPROMs. This meant that a monitor program had to be written to enable communication with computer 112 via console terminal 122.

The monitor program which was written enabled communication with the console terminal 122; changing values in RAM memory; display of values stored in RAM and EPROM memory; transfer of values from EPROM to RAM memory; display of values stored in internal registers; and starting of execution of the machine control program at any address. Therefore, in order to start the combine 50 ground speed control program, the microprocessor was instructed to begin execution at the beginning address of that program. To stop the controlling program, the manual interrupt switch 132 could be activated to return the computer to the monitor program.

When the machine control computer was constructed, provisions were made so that all of the operational input signals could be simulated and the computer output signals could be read with a voltmeter. The voltage input signals (feeder pressure, commanded speed, adjustable target engine speed input signals—speed within a deadband at which the ground speed controller endeavors to keep the engine speed) were simulated by potentiometers 148, 144, 146. The engine speed was simulated by a frequency generator 165 whose output was connected to where the actual engine speed sensor would be connected. The variable potentiometers 144, 146, 148 were connected to SPDT switches 150, 152, 154 so the inputs to A/D converter 120 could be switched between the variable potentiometers 144, 146, 148 and actual combine operating signal sources. The software was tested to insure the right control logic was occurring for given input conditions.

Once the machine control computer 112 and other hardware were mounted on the combine 50, the interface between the computer 112 and the combine was through three connectors. Two conductors for the engine speed, the conductors from the operator's commanded ground speed control, and the amplified differential feeder pressure signal-carrying conductors were coupled through one of the connectors. The controlling output voltage conductor had its own connector. The third connector provided a common ground between the combine and the computer housing and the + and −12 volts supplies from the combine. The +12 V——12 V were connected to variable potentiometers 144, 146, 148 which were used during testing, but only one (target engine speed—146) was used during actual field runs.

The same signals were also provided to the data acquisition and storage computer 104 for recording and later analysis. The only signal not recorded by computer 104 was the output of variable potentiometer 146 for adjusting the target engine speed. During field tests, potentiometer 146 was set to 0 volts (no adjustment from the set target engine speed). This "set" target engine speed was changed by entering a new value through the software of the controlling program between tests.

The controller was initially tested by running the combine 50 on a road. The engine speed was adjusted by moving the throttle 85. The acceleration and deceleration variables were changed to give what were thought to be the appropriate rates. This road testing process gave the operator more confidence that the controlling program was working correctly. Again, since there was no crop entering the combine 50, the differential feeder pressure was simulated by a variable potentiometer 148.

The combine 50 controller was then field-tested in wheat where more adjustments of the acceleration and deceleration rates were made. Field tests were made and data recorded for later analysis.

The feeder conveyor 86 pressure transducer provided a reliable signal when material was being conveyed to the combine's threshing unit 170. The data in FIG. 6 shows a typical, definite jump as the crop material enters the feeder conveyor 86 and a drop when the feeder conveyor 86 is empty. The feeder 86 pressure value used to initiate and terminate the controlling portion of the software program was determined by running the controlling program and then interrupting it with the momentary toggle switch. The average feeder pressure during "no crop flow" and "material entering" modes was found by using this interrupt method and by reading the controlling program's calculated average feeder pressure stored in RAM memory with the monitor program. The average feeder pressure value for "material entering" condition was approximately 500 psi and the "no crop flow" pressure was approximately 180 psi. Therefore, a feeder 86 pressure value of 374 psi was selected to turn the program on and off.

The feeder pressure used in the control algorithm that determined if the feeder conveyor 86 was plugged had to be chosen from early field runs under heavy crop condition. The value of 1,400 psi was chosen. It was low enough so that the averaging equation did not cause a long time delay before the program reacted to the potential plugging condition. If too low a pressure value had been chosen, the combine 50 could have been slowed by the program when the feeder 86 pressure momentarily went high as a large brief slug of material entered the conveyor 86. The plugging pressure's value was not critical because if the plug condition cleared quickly, the averaged feeder pressure would again decrease below the "plugged" set point and the controlling program would return to normal control based on engine 90 speed before excessive deceleration occurred.

Field tests were run to determine optimum acceleration and deceleration rates while retaining acceptable operator/speed performance for the automatic speed control algorithm. Hereinafter, acceleration is intended to mean both acceleration and deceleration, except as otherwise noted.

Table I illustrates a summary of the data recorded from the controller test runs. The "File No." is where the file is stored in the computer 104. The first three digits in the file number represent the month and day of harvest. The target engine speed was the value entered into the software by the operator, about which the controlling program attempted to keep the engine speed. The average engine 90 speed is the average speed recorded by the DAS computer 104. The engine speed standard deviation was from the speed recorded by the DAS computer 104. The average and the standard deviation of the engine 90 speed were only calculated when the commanded ground speed was above 6.5 kph (4 mph) and the feeder 86 pressure showed material was entering the combine.

TABLE I

| | | GROUND SPEED CONTROL RESULTS | | | |
|---|---|---|---|---|---|
| Run | File No. | Target Engine Speed (rpm) | Average Engine Speed (rpm) | Difference Between Speeds (rpm) | Standard Deviation of Engine Speed (rpm) | % Moisture (Wheat) |
| 1 | 712-2 | 2616 | 2574 | 42 | 30.8 | 12.8 |
| 2 | 712-4 | 2616 | 2556 | 60 | 36.2 | 12.8 |
| 3 | 712-6 | 2616 | 2547 | 69 | 31.7 | 12.8 |
| 4 | 712-8 | 2616 | 2549 | 67 | 33.1 | 12.5 |
| 5 | 712-11 | 2603 | 2533 | 70 | 34.8 | 12.5 |
| 6 | 716-5 | 2577 | 2535 | 42 | 30.7 | 12.7 |
| 7 | 716-9 | 2598 | 2532 | 66 | 34.2 | 12.0 |
| 8 | 716-13 | 2598 | 2521 | 77 | 34.9 | 12.0 |
| 9 | 716-16 | 2598 | 2518 | 80 | 32.5 | 17.0 |
| 10 | 717-6 | 2610 | 2528 | 82 | 37.2 | 14.0 |
| 11 | 717-9 | 2610 | 2517 | 93 | 49.9 | 13.5 |

The acceleration rates and accompanying data from the test runs are shown in FIGS. 6–17. In the graphs, the data from the various runs are shown immediately before the acceleration and deceleration rates which produced those data.

In FIGS. 6–17, the normalized ordinate axis values were as follows: engine speed—1,000 equals 1,000 rpm; feeder pressure—1,000 equals 310 psi (through FIG. 11); feeder pressure—1,000 equals 420 psi (FIG. 12 through FIG. 17); commanded ground speed—1,000 equals 10 mph; actual ground speed—1,000 equals 10 mph.

Since the combine operator has the option to change the target engine speed, he can, in effect, change the mass flow rate through the combine 50. In earlier conventional combines (cylinder threshing), the amount of grain loss increased substantially with increased mass flow rate through the combine. Grain losses in such equipment could actually determine the maximum mass flow rate. Grain loss versus mass flow rate was recorded during wheat harvest to see if this relationship held true with the combine used in these trials.

The data plotted in FIG. 18 illustrates a trend. Grain loss increased with mass flow rate with combine 50. However, the losses were still small enough (less that 0.6 bushels per acre) that they were acceptable. It is felt that, in wheat, grain losses do not determine the maximum mass flow rate through the combine. Therefore, the ground speed controlling program need not keep track of grain losses in a properly adjusted rotary combine to determine the maximum acceptable ground speed.

In summary, ground speed control based upon engine 90 speed and feeder 86 pressure provided a sound automatic control and deterrent against plugging the feeder. Engine speed as the main controlling variable provided sufficient control for harvesting mature wheat and corn. Crop moisture had an effect on the needed response of the ground speed controller. The best controller response was realized when using the acceleration curves illustrated in FIG. 15. However, control characteristics could vary, depending upon the size of the grain head as well as other variables. The grain loss samples from varying trial mass flow rates through the combine 50 demonstrated small, acceptable losses. Thus, the ground speed controller can optimize the power of the engine 90 by keeping the combine 50 operating at a full load condition, without regard to the significance of losses.

What is claimed is:

1. In a combine having an engine, a feeder conveyor, a threshing rotor, means for coupling the threshing rotor to the engine for driving the threshing rotor, and means for coupling the feeder conveyor to the engine for driving the feeder conveyor, an automatic control for combine ground speed comprising means for sensing the mass of a crop being harvested on the feeder conveyor and for generating a signal related thereto, means for sensing the engine speed and for generating a signal related thereto, means for generating a desired engine speed signal, means for generating a maximum combine ground speed signal, a controller, means for coupling the feeder crop mass sensing means to the controller, means for coupling the engine speed sensing means to the controller, means for coupling the desired engine speed signal generating means to the controller, means for coupling the maximum combine ground speed signal generating means to the controller, means for varying the ground speed of the combine in response to a first speed control signal, and means for coupling the combine ground speed varying means to the controller, the controller including means for establishing a first set-point indicative of the presence of a crop being harvested on the feeder conveyor, the controller including means for comparing the feeder crop mass sensing means signal to the first set-point and means for comparing the engine speed signal to the desired engine speed signal, the comparing means generating the first speed control signal primarily in response to the maximum combine ground speed signal when the comparison of the feeder crop mass sensing means signal with the frist set-point indicates that the mass of a crop being harvested is generally less than the limit established by the first set-point and generating the first speed control signal primarily in response to the comparison of the desired engine speed signal with the actual engine speed signal limited by the maximum combine ground speed signal when the comparison of the feeder crop mass sensing means signal with the first set-point indicates that the mass of a crop being harvested on the feeder conveyor is generally greater than the limit established by the first set-point.

2. The speed control of claim 1 and further comprising means for establishing a second set-point indicative of overloading of the feeder conveyor and means for comparing the feeder crop mass sensing means signal to the second set point and generating the first speed control signal to decelerate the combine quickly when the comparison of the feeder crop mass sensing means signal with the second set-point indicates that the crop mass being harvested on the feeder conveyor is generally greater than the limit established by the second set-point.

3. The speed control of claim 2 wherein the controller further icludes means for establishing combine ground speed acceleration and deceleration rates and means for controlling the rate of change in the first speed control signal in response to the acceleration and deceleration rates to control the combine ground speed acceleration and deceleration.

4. the speed control of claim 2 wherein the means for coupling the feeder conveyor to the engine comprises a fluid motor for driving the feeder conveyor, means for coupling the fluid motor to the engine for driving the fluid motor, and means for coupling the fluid motor to the feeder conveyor, the means for sensing the mass of crop being harvested on the feeder conveyor comprising means for sensing the pressure drop across the fluid motor.

5. The speed control of claim 3 wherein the means for coupling the feeder conveyor to the engine comprises a fluid motor for driving the feeder conveyor, means for coupling the fluid motor to the engine for driving the fluid motor, and means for coupling the fluid motor to the feeder conveyor, the means for sensing the mass of a crop being harvested on the feeder conveyor comprising means for sensing the pressure drop across the fluid motor.

6. In a combine having an engine, a feeder conveyor, a threshing rotor, means for coupling the threshing rotor to the engine for driving the threshing rotor, and means for coupling the feeder conveyor to the engine for driving the feeder conveyor, a method for automatically controlling combine ground speed comprising the steps of sensing the mass of a crop being harvested on the feeder conveyor and generating a signal related thereto, sensing the engine speed generating a signal related thereto, generating a desired engine speed signal, generating a maximum combine ground speed signal, establishing a first set-point indicative of crop being harvested on the feeder conveyor, comparing the feeder conveyor crop mass signal to the first set-point and varying the combine ground speed primarily in response to the maximum combine ground speed signal when the comparison of the feeder conveyor crop mass signal with the first set-point indicates that the mass of crop being harvested on the feeder conveyor is generally less than the limit established by first set-point and varying the combine ground speed primarily in response to the comparison of the desired engine speed signal with the engine speed signal limited by the maximum combine ground speed signal when the comparison of the feeder conveyor crop mass signal with the first set-point indicates that the crop mass being harvested on the feeder conveyor is generally above the limit established by the first set-point.

7. The method of claim 6 and further comprising the steps of establishing a second set-point indicative of overloading of the feeder conveyor, comparing the feeder conveyor crop mass signal with the second set-point, and quickly decelerating the combine when the comparison of the feeder conveyor crop mass signal with the second set-point indicates that the crop mass being harvested on the feeder conveyor is generally above the limit established by the second set-point.

8. The method of claim 7 and further including the steps of establishing combine ground speed acceleration and deceleration rates and controlling the combine ground speed acceleration and deceleration in response to the acceleration and deceleration rates.

* * * * *

UNITED STATES PATENT AND TRADEMARK OFFICE
CERTIFICATE OF CORRECTION

PATENT NO. : 4,487,002

DATED : December 11, 1984

INVENTOR(S) : James W. Kruse, Gary W. Krutz and Larry F. Huggins

It is certified that error appears in the above-identified patent and that said Letters Patent is hereby corrected as shown below:

At column 4, line 65, delete "movin9" and insert therefor --moving--;

At column 13, line 62, delete "frist" and insert therefor --first--;

At column 14, line 18, delete "icludes" and insert therefor --includes--;

At column 14, line 24, delete "the", first occurrence, and insert therefor --The--; and At column 14, line 50, after "speed", insert --and--.

Signed and Sealed this

Fourteenth Day of May 1985

[SEAL]

Attest:

DONALD J. QUIGG

*Attesting Officer*  *Acting Commissioner of Patents and Trademarks*